United States Patent [19]

Estes

[11] Patent Number: 4,799,766

[45] Date of Patent: Jan. 24, 1989

[54] OBJECTIVE LENS SUPPORT AND POSITIONING SYSTEM

[75] Inventor: Marvin F. Estes, Oakfield, N.Y.

[73] Assignee: Eastman Kodak Company, Rochester, N.Y.

[21] Appl. No.: 168,209

[22] Filed: Mar. 15, 1988

[51] Int. Cl.$^4$ .............................................. G02B 7/02
[52] U.S. Cl. .................................... 350/252; 350/255; 369/45
[58] Field of Search ....................... 350/252, 255, 247; 369/44, 45, 46; 250/201

[56] References Cited

U.S. PATENT DOCUMENTS

| 4,092,529 | 5/1978 | Aihara et al. | 250/201 |
|---|---|---|---|
| 4,302,830 | 11/1981 | Hamaoka et al. | 369/45 |
| 4,321,701 | 3/1982 | Arquie et al. | 369/45 |
| 4,386,823 | 6/1983 | Musha | 350/247 |
| 4,408,313 | 10/1983 | Musha | 369/45 |
| 4,419,614 | 12/1983 | Kimura | 318/653 |
| 4,507,764 | 3/1985 | Musha | 369/45 |
| 4,507,765 | 3/1985 | Suzuki et al. | 369/45 |

FOREIGN PATENT DOCUMENTS

| 0229750 | 12/1984 | Japan | 350/255 |
|---|---|---|---|
| 2139136 | 6/1987 | Japan | 350/255 |

OTHER PUBLICATIONS

IEEE Transactions on Industry Applications, vol. IA-20, No. 6, Nov./Dec. 1984, by H. Von Seggern, "Improved Surface Voltage Uniformity on Electrets Obtained by Modified Corona Charging Method", pp. 1623–1626.

J. Appl. Phys. 54(7), Jul. 1983, by A. Abazi and O. D. Jefimenko, "Forces and Torques Acting on Plane and Cylindrical Electrets in Slot-Effect Transducers", pp. 4076–4082.

J. Acoust. Soc. Am. 78(2), Aug. 1985, by I. J. Busch-Vishniac, "Optical Design of a Foil Electret Earphone for use in Telephony", pp. 398–405.

*Primary Examiner*—John K. Corbin
*Assistant Examiner*—Loha Ben
*Attorney, Agent, or Firm*—Edward Dugas

[57] ABSTRACT

An objective lens is affixed to a permanent magnet which in turn is affixed to an electret material having an inherent charge. A support structure for the permanent magnet is formed from an array of electromagnets which partially surround the permanent magnet. Current signals are controllably applied to the electromagnets to generate a magnetic support field for supporting the permanent magnet and its mounted objective lens. Sensors are provided for sensing the charge inherent in the electret material as a function of the position of the electret material from the sensors. The sensors provide position signals to a control device, such as a microprocessor, which control device provides current signals to the electromagnet array to position the permanent magnet and the associated objective lens at a desired position.

7 Claims, 2 Drawing Sheets

OBJECTIVE LENS SUPPORT AND POSITIONING SYSTEM

BACKGROUND OF THE INVENTION

This invention relates to the field of optical devices of the type which record or read information onto or from a storage media along one or more parallel tracks. More particularly, the invention is directed to a system for positioning and focusing an objective lens over a track for the purpose of reading and/or recording.

One type of recording medium that utilizes a large number of tracks is a video disc. To read information from a video disc the video disc is rotated at a relatively high rate of speed and a light source such as a laser beam is focused on one of the tracks of the disc as a light spot. The light spot (beam) is modulated or interrupted as a function of the recorded information and the modulated beam is utilized to reconstruct the recorded information. One important property of such a recording scheme is the ability to have a lare number of tracks positioned closely adjacent to each other on the video disc, resulting in the width of each track and the space between successive tracks being very narrow. The diameter of the light spot, used either for recording or for reading, therefore has to be relatively small. Such being the case, the light spot must be maintained as a focused spot using some form of dynamic focusing. In addition, if the light spot is not maintained in alignment over the track that is desired to be read or recorded upon, an error will be produced.

Therefore, it is also desirable to have a system wherein the light spot may be moved in a direction perpendicular to the track, also in a dynamic fashion, so as to maintain the spot in alignment with the track as the track is rotated on the disc.

Systems for obtaining fine positional control for the focusing and tracking of objective lenses have traditionally utilized interconnected mechanical moving parts involving springs, membranes, coils or other mechanical contrivances.

In U.S. Pat. No. 4,419,614 entitled "Apparatus for Driving Objective Lens in Tracking Direction" by K. Kimura there is disclosed an apparatus for driving an objective lens in a tracking direction perpendicular to the optical axis of the objective lens and to the path of the track. The apparatus is comprised of first and second permanent magnet members arranged symmetrically with respect to a plane which includes the optical axis of the objective lens and which is at right angles to the tracking path direction. First and second magnetic members are arranged across the poles of the first and second permanent magnet members with a third magnetic member arranged within a space surrounded by the first and second permanent magnet members and the first and second magnetic members being movable in the tracking direction together with the objective lens. First and second coils are wound around the first and second magnetic members with the third magnetic member and objective lens being movable in the tracking direction by supplying a tracking control signal to the first and second coils.

A magneto-electro transducer is provided for detecting a magnetic flux leaking from the third magnetic member to produce an electrical signal representing the displacement of the third magnetic member and the objective lens in the tracking direction.

A means is provided for feeding back the displacement electrical signal to the tracking control signal to suppress a resonant vibration of the third magnetic member and the objective lens.

In the aforementioned patented system the third magnetic member and the objective lens are supported movably in the tracking direction by means of a resilient supporting member such as a pair of leaf springs which extend in the direction of the optical axis. A system which could eliminate the interconnected mechanical moving parts, such as the pair of leaf springs would have a higher resonant frequency and would not deteriorate with time.

SUMMARY OF THE INVENTION

The present invention has for a primary object the provision of an improved system for supporting an objective lens in the tracking and focusing directions without using mechanical supports.

In the preferred embodiment an objective lens is affixed to a premanent magnet. An electret material, having an inherent charge, is also affixed to the permanent magnet to provide the one moving structure.

A magnetic supporting structure is formed from an array of electromagnets which partially surround the moving structure. Current signals are controllably applied to the electromagnets to generate a magnet support field for the moving structure.

Sensors are provided for sensing the charge inherent in the electret material as a function of the position of the electret material from the sensors to provide position signals. A control device receives the position signals and provides current signals to the electromagnets to position the moving structure to a desired position. A microprocessor is used to process the position signals to provide the necessary current to the supporting magnetics to accurately position the objective lens.

From the foregoing, it can be seen that it is another object of the present invention to provide a magnetic support means for an objective lens which uses only one moving part.

It is yet another object of the present invention to provide an objective lens which has a very high resonant frequency due to a small mass.

It is a further object of the present invention to provide an objective lens positioning and focusing system which inherently has a long-life expectancy with a minimum amount of deterioration in performance.

These and other objects of the invention will become more apparent from the following description when taken in conjunction with the drawings in which like characters indicate like parts and which drawings form a part of the present description.

DESCRIPTION OF THE PREFERRED EMBODIMENT

Figure 1:
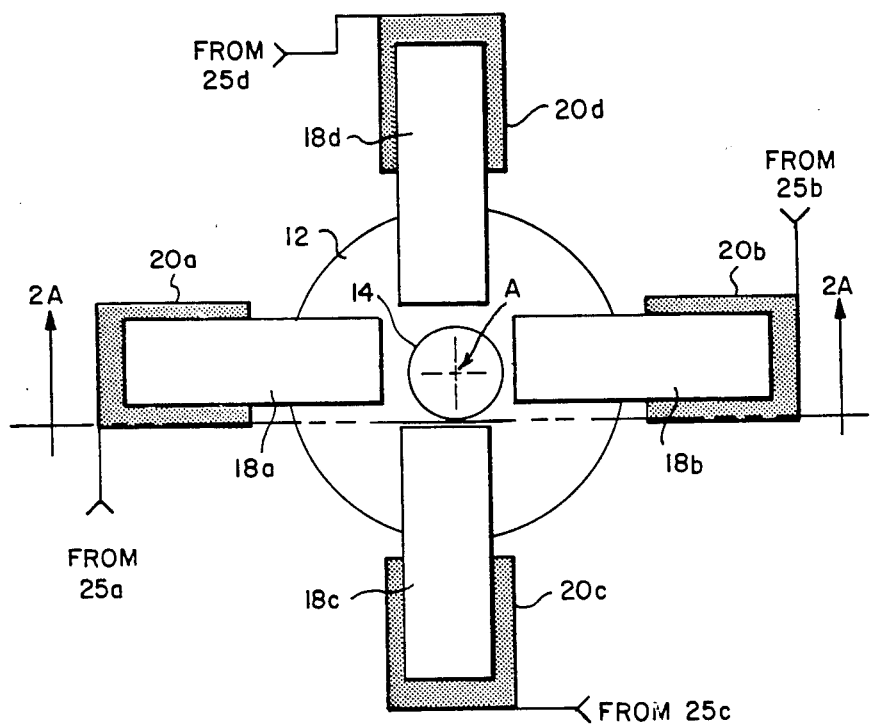
FIG. 1 is a top view of the lens support system.
Figure 2:
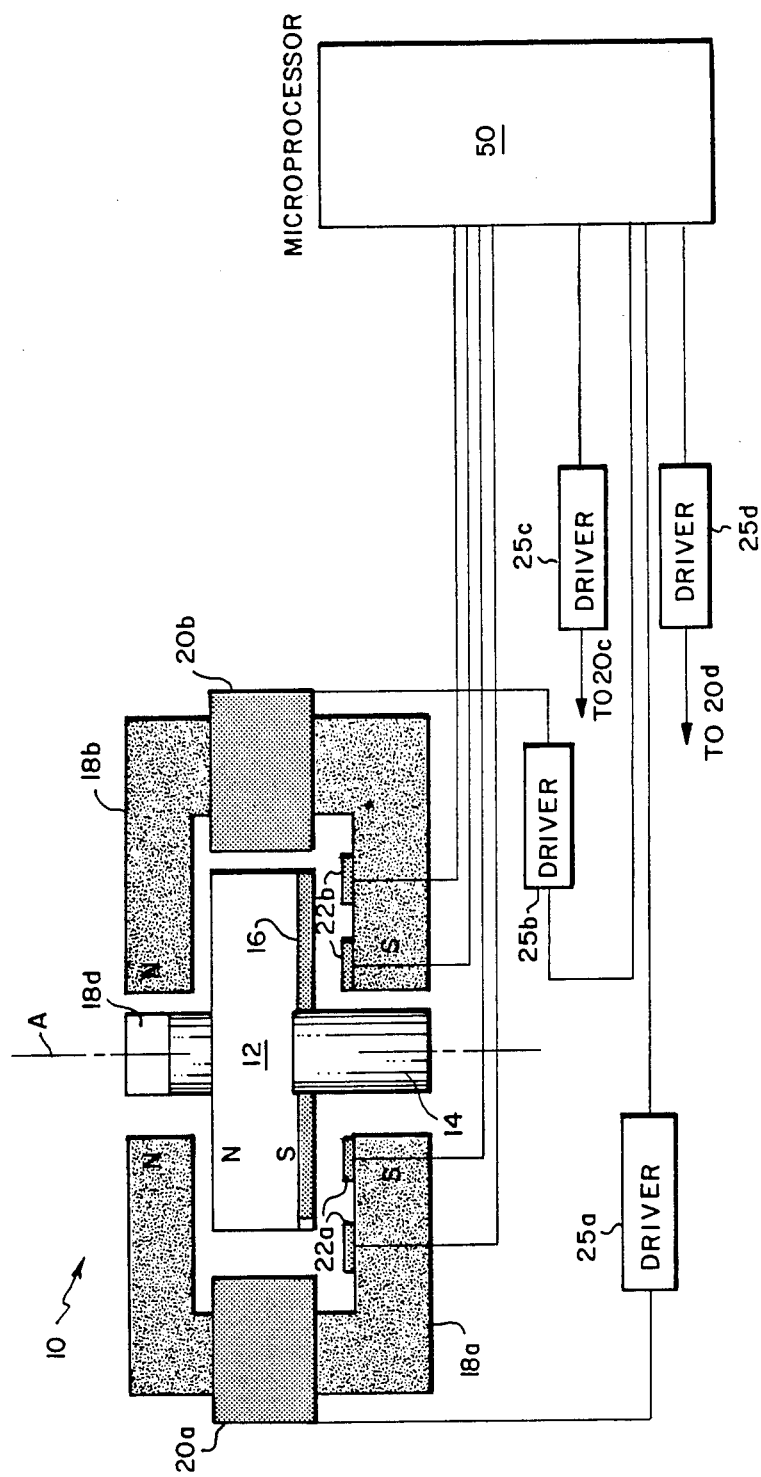
FIG. 2 is a partially sectioned view of the support system taken along the section lines 2A of FIG. 1 along with associated electronics.

Referring to FIG. 1, in conjunction with FIG. 2, the support and positioning system of the present invention incorporates an array of four U-shaped ferrous metal pole pieces 18A through 18D, each having an electromagnetic coil 20A through 20D, respectively, wound around the center thereof which are symmetrically arranged around a nominal center line A. Positioned within the U-shaped opening of the metal pole pieces is a thick disk-shaped permanent magnet 12 having an objective lens 14 mounted through its center with the optical axis of the objective lens corresponding to the center line A. On one of the major surfaces of the permanent magnet 12 is mounted a relatively thin wafer-like layer of an electret material 16. On the inner surface of the U-shaped pole pieces 18, closest to the electret material 16, is positioned pairs of spaced apart, electrode plates 22A through 22D. Each pair of plates provides an electrical signal to a microprocessor 50. The plates 22 sense the charge on the electret material which corresponds in strength to the position of the magnet 12, and in turn the lens 14. The microprocessor 50 utilizes the position signal to provide drive signals to the electromagnetic coils 20A through 20D. The drive signals from the microprocessor 50 are received at the inputs of four driver circuits 25A through 25D which circuits convert the level of the microprocessor drive signals to the appropriate level of drive currents to the electromagnetic coils 20A through 20D to cause the magnet 12 to be positioned in a desired location. The electret layer 16 may be a thin polarized film of polymer which permanently carries internal and surface charges.

Referring specifically to FIG. 2, as the lens moves along its optical axis, the distance between the electret 16 and the pairs of plates 22A through 22D will increase and/or decrease depending on the direction of axial movement. This in turn will cause the charge sensed by the plates to increase and/or decrease as a function of the distance of the electret 16 from the pairs of plates. This charge sensing provides positional control signals to the microprocessor 50. In a like manner, a tilting of the lens 14 will cause the charge sensed, for example, by the plate pair 22B to be different from the charge sensed by the plate pair 22A. In response to the sensed signals, the current provided to the support coils 20A through 20D is varied on an individual basis so as to create the desired positioning of the lens 14.

Movements or positions of the magnet 12 which are perpendicular to the optic axis of the lens 14 will cause a lessening of the charge sensed by one pair of sensors and a proportional increase in the charge sensed by the opposite pair of sensors. This is because the electret material 16 will be positioned over more of the surface area of the plates on one side and over less of the surface area of the plates on the other side with the amount of surface area being covered being a function of the displacement of the lens 14 from a centered position.

Control of the perpendicular direction can be affected by applying different values of current to the support coils 20A through 20D.

Although one means has been shown for supporting the lens 14 without a physical support structures, it will be obvious to those persons skilled in the art that other means of configuring the magnetic support structure in accordance with the teaching of the present invention can be utilized.

From the foregoing, it can be seen that Applicant's invention is primarily directed to the use of an electret material to provide position sensing for an objective lens that is supported solely in a magnetic field.

While there has been disclosed what is considered to be the preferred embodiment of the invention, it will be manifest that many changes and modifications may be made therein without departing from the essential spirit of the invention. It is intended, therefore, in the annexed claims, to cover all such changes and modifications as may fall within the true spirit of the invention.

I claim:

1. An objective lens support and positioning system comprising:
    an objective lens;
    a permanent magnet affixed to said objective lens;
    an electret material having an inherent charge affixed to said permanent magnet;
    an electromagnet array for providing a magnetic field to said permanent magnet for supporting said permanent magnet and said objective lens;
    sensing means for sensing corresponding charges on said electret material as a function of relative positions of said electret material with respect to said sensing means and for providing position signals; and
    means for providing currents to said electromagnet array as a function of the position signals for controlling the position of said permanent magnet and said objective lens with respect to said electromagnet array.

2. The objective lens and positioning system according to claim 1 wherein said permanent magnet is a disk with said objective lens mounted through the center thereof.

3. The objective lens and positioning system according to claim 2 wherein said electromagnet array is symmetrically positioned around said permanent magnet disk.

4. The objective lens and positioning system according to claim 3 wherein said sensing means is comprised of pairs of spaced apart electrode plates affixed to the electromagnet array.

5. An objective lens support and positioning system comprising:
    an objective lens having an optical axis;
    a disk member of permanent magnet material affixed to said objective lens;
    a disk wafer of electret material having an inherent charge affixed to said disk member;
    a plurality of U-shaped pole pieces symmetrically positioned around the edges of said disk member;
    a plurality of coils, each wound around the center of a corresponding pole piece;
    a plurality of pairs of sensor plates, each pair affixed to a corresponding U-shaped pole piece adjacent said disk wafer of electret material; and
    control means coupled to said pairs of sensor plates for sensing the strength of the charge of said electret material as a function of the distance between the pairs of sensor plates and said disk wafer and for providing current to said plurality of coils so as to position said objective lens at a desired position.

6. An objective lens support and positioning system according to claim 5 wherein said control means provides currents to selected coils of said plurality of coils so as to selectively position said objective lens.

7. An objective lens support and positioning system according to claim 6 and further comprising driver means interposed between said control means and said plurality of coils for driving current through said coils as a function of the position of said objective lens from a desired position.

* * * * *